(12) United States Patent
Link

(10) Patent No.: US 6,230,866 B1
(45) Date of Patent: May 15, 2001

(54) ELECTROMAGNETIC COUPLER

(75) Inventor: Larry Ray Link, Frankfort, IL (US)

(73) Assignee: American Metal & Plastics, Inc., Grand Rapids, MI (US)

( * ) Notice: Subject to any disclaimer, the term of this patent is extended or adjusted under 35 U.S.C. 154(b) by 0 days.

(21) Appl. No.: 09/379,445

(22) Filed: Aug. 23, 1999

Related U.S. Application Data

(63) Continuation of application No. 08/920,569, filed on Aug. 29, 1997, now Pat. No. 5,947,248.

(51) Int. Cl.[7] .............................. F16D 19/00; H02K 49/00
(52) U.S. Cl. .......................... 192/84.1; 310/92; 310/103
(58) Field of Search .......................... 192/21.5, 84, 961; 310/62, 92, 103, 187

(56) References Cited

U.S. PATENT DOCUMENTS

| | | | | |
|---|---|---|---|---|
| 3,924,585 | * | 12/1975 | Woods | 192/84.961 |
| 4,074,663 | * | 2/1978 | Cory | 192/82 T X |
| 4,102,130 | * | 7/1978 | Stricklin | 60/370 X |
| 4,509,091 | * | 4/1985 | Booth | 192/84 R X |
| 5,307,644 | * | 5/1994 | Cummins et al. | 62/133 |
| 5,565,723 | * | 10/1996 | Dastidar | 310/103 |
| 5,724,941 | * | 3/1998 | Suzuki et al. | 123/41.15 X |
| 5,896,964 | * | 4/1999 | Johnston et al. | 192/21.5 |

* cited by examiner

*Primary Examiner*—Charles A. Marmor
*Assistant Examiner*—Roger Pang
(74) *Attorney, Agent, or Firm*—Fitch, Even, Tabin & Flannery

(57) ABSTRACT

An electromagnetic coupler couples a first rotating element with a second element with a torque transfer between the first and second elements. The coupling is solely by a magnetic field which can be fully coupled, fully uncoupled or modulated to provide a variable transmission of power between the first and second elements. The electromagnetic coupler comprises a set radially disposed electromagnets and a concentric set of pole pieces separated by an air gap. The magnetic field between the electromagnets and the pole pieces is increased as the current through the electromagnets is increased. At low current, there is substantial slippage between the respective driving and driven elements. With full magnetic coupling, the electromagnets and pole pieces are fully coupled or without any slippage therebetween. When the magnetic field is eliminated, there is no torque transfer between the driving and driven elements.

6 Claims, 5 Drawing Sheets

ELECTROMAGNETIC COUPLER

This is a continuation, of prior application Ser. No. 08/920,569, filed Aug. 29, 1997, now U.S. Pat. No. 5,947,248, which is hereby incorporated herein by reference in its entirety.

FIELD OF THE INVENTION

This invention relates to a temperature control system for internal combustion engines having a fan and a fan clutch to drive the fan, and to an electromagnetic fan clutch for use in such systems.

BACKGROUND OF THE INVENTION

The present invention relates to providing a new and improved temperature control system for internal combustion engines having a cooling liquid therein. In a typical vehicle having a liquid cooled internal combustion engine, the fan clutch is either disengaged completely with two clutch faces separated or fully engaged with the two clutch faces transmitting power across the clutch face interface without any slippage between the faces. Usually, the clutch faces are engaged or disengaged pneumatic or electromagnet actuators. When the clutch is engaged in a large truck, considerable horsepower is used to drive the fan. Where the fan is a 32" diameter fan, the horsepower used to drive the fan can be as much as 40–80 horsepower for large trucks which have engines in the range of 200–600 horsepower. On the other hand, when the fan is fully off, the fan is disconnected from the power drive from the engine's crankshaft. The fan is free-wheels and does not contribute to cooling of the engine. In these particular type of on/off electromagnetic and air-actuated fan clutches, the fan is disconnected when the engine is cold or is being adequately cooled, for instance when air is forced rapidly through the radiator by high speed travel of the vehicle.

The control system for the fan clutch includes a thermostat, which monitors the engine or the cooling fluid temperature and tries to maintain the temperature within a predetermined range—for example, 181° F.–190° F.; and the control system includes a speed measuring sensor which disengages the clutch when the vehicle speed reaches a set speed—for example, 30 mph. At 30 mph, it is assumed that there is sufficient ram air flow across the radiator to cool the engine without operation of the fan.

With large trucks which are running at 2,100 rpm and which use 40–80 horsepower to drive a large fan having a large movement of inertia, e.g., a 32-inch diameter fan, it is necessary to build a fairly substantial fan clutch to withstand the shock of suddenly engaging and rotating the inertia of a stationary, driven clutch face and its attached fan quickly to its full rotational speed. Consequently, current fan clutches are quite large and substantially made to withstand such shock loads.

In addition to such load problems from the large movement of inertia, another problem with current fan clutch systems is that of chattering, i.e., an abrupt, recurring, on/off engagement of the clutch fan faces due to a rapid opening and closing of a thermostat switch trying to maintain the cooling temperature between 181° F. and 190° F. Typically, the on/off thermostat has a variation of seven degrees (7° F.) with a tolerance of plus or minus two (2° F.) degrees between turning on or shutting off. In some adverse, ambient conditions of operation, this cycling goes back and forth as many as 50 times per hour, thereby causing wear and tear on clutch faces, when they are being repeatedly mechanically engaged and disengaged.

When the clutch is operated by an air pressure system from the truck's compressed air system, other problems arise. That type of clutch uses compressed air to operate the clutch actuator system. It is difficult to keep the compressed air clean. The truck compressor air is usually too dirty to be used directly to operate the fan clutch actuator system. The air must first be cleaned by bubbling it through oil in an oil filter which traps dirt from the air. If the oil in the filter becomes dirty, it will pass contaminants. The still-contaminated air may compromise a downstream pressure regulator resulting in an insufficient air pressure for operating the clutch actuator, e.g., the air pressure may drop below 70 pounds and not provide sufficient force to operate the clutch. If the fan is not operated, the temperature can reach 450° F. at the fan blades. The plastic fan may ignite setting the entire truck afire. Pneumatic fan clutch systems are bulky and expensive.

With the current fan clutch systems, the driver turns on the air conditioning system for the truck and the fan clutch is automatically engaged to turn the fan at full speed even though full fan speed may not be needed for adequate cooling of the engine. For example, the ram air flowing through the radiator at high vehicle speeds could be sufficient to keep the air conditioner and the truck engine temperature low enough without the fan. While engaging the fan clutch when the air conditioner switches on ensures that the air conditioning system and the engine are kept cool at all times, it wastes energy.

Current fan clutch systems in trucks have the fan mounted fairly high which keeps the nose or the front end of the vehicle high. Truck manufacturers and truck drivers want to lower the truck nose for streamlining the aerodynamics of the truck and to provide a better view of the road. In some trucks, the radiator has been turned on its side so that it is a side-flow radiator in order to lower the tractor nose profile. In some tractors, there is insufficient space to position a large fan on its side and place it between the frame rails for the vehicle. Hence, the fan cannot be side-mounted to drop it lower.

These electromagnetic and pneumatically-clutched fans are not rapidly connected to the engine crankshaft because the crankshaft vibrates at a natural frequency that causes the engaged faces of the clutch plates to vibrate against one another and to wear quickly. Thus, most trucks in the United States have a fan belt drive from the crankshaft to the fan clutch which is located above the crankshaft. A fan belt drive, however, takes space, and the belt is subject to failure. The fan belt system also adds cost to the engine cooling system. Although many truck manufacturers would prefer to lower the radiator and fan to the location of the crankshaft, they are unable to do so because of the crankshaft vibrations and the space needed for the fan belt drive of the fan clutch and fan.

Some vehicles, principally in Europe, have a fan clutch which is mounted on the crankshaft and which is always partially engaged to transfer a certain amount of power to the fan. For example, at least 40% of the power to turn the fan to full speed needed and up to 90% of the power needed to turn the fan at full speed. This clutch never transfers 100% of the power needed, and this clutch is never totally disengaged such that the fan can be free-wheeling. This particular type of clutch also has a vibration isolator which to some extent serves to dampen or isolate vibrations at the fan clutch from the crankshaft vibrations. If the vibration isolator wears out allowing vibration to be transmitted, the clutch will wear out in only a few days.

Such a constantly engaged fan wastes fuel. If the fan consumes a maximum of 40–80 horsepower, and the fan never uses less than 40% of its input power, this means that at least 16 horsepower is being consumed that may not be needed. At the higher end, 40% of the 80 horsepower is 32 horsepower which may not be needed but it is always being expended. This unneeded expenditure of energy results in fuel inefficiencies for vehicles having such fan clutches.

Similarly, in most automobiles, the fan runs continually while the vehicle engine is running. Such continuous fan operation wastes fuel, particularly when the engine is moving at a sufficient speed to provide ram air which would cool the engine; or when the engine is cold and there is no need for any further cooling by a fan.

It will be appreciated that pneumatic or electromagnetic actuators for bringing the clutch faces into engagement are relatively complex, occupy considerable space, heavy and costly. The controls using the thermostat on and off switch as well as a speedometer sensor on/off switch provide the most rudimentary information because more information would not enable any more sophisticated thermal management due to the fact that the clutch cannot be modulated in its torque transfer and thereby achieve proportional control of engine temperature. Also, it will be appreciated that the amount of horsepower being used for a fan cooling system is very substantial in that great fuel economy savings could be accomplished by having an improved fan clutch and control system for the internal combustion engine cooling.

SUMMARY OF THE INVENTION

In accordance with the present invention, there is provided a new and improved fan clutch system for use with an internal combustion engine which provides variable speed drive of the fan by the engine with the coupling between the fan and the engine being solely by a magnetic field. The variable speed drive provides true proportional control of the convective heat transfer rate from the radiator.

In accordance with the preferred embodiment of the invention, the fan may be fully uncoupled so as to not use any power when the engine is cold or adequately cooled by air flow, and may be coupled in a modulated manner for transmission of variable power depending upon the cooling needs up to and including a full coupling where the need is the greatest for cooling. The torque transfer between the driving element of the electromagnetic clutch and the driven element of the electromagnetic clutch is modulated by controlling the electric power to the clutch to provide a true, variable speed for the fan.

In contrast to the electromagnetic or the pneumatically-powered clutches of the prior art used for driving fans, there are no face plates which are brought into engagement or disengagement; but there is a space or air gap between the driving electromagnetic portion and the driven electromagnetic portion of the clutch. There is the ability to have a smooth, torque transfer with the current being varied to the electromagnetic fan clutch with slippage between the driving and driven clutch elements in a predictable manner with changes in voltage. For example, the voltage may be varied from as low as one volt for low current with very high slippage up too much as to the full voltage, e.g., twelve (12) volts for high current with no slippage between the driving clutch and driven clutch elements. There is a smooth torque transfer which is modulated electrically.

The illustrated and preferred electromagnetic fan clutch is simple as compared to the existing fan clutches in that its rotating parts are lighter, have a smaller moment of inertia, and longer life, and there is no need for an pneumatic supply to engage or to disengage the clutch. Unlike some of the current crankshaft-mounted systems that have a 40% engagement at all times, the electromagnetic clutch of the present invention may be completely uncoupled so that the fan is free-wheeling when it is not needed and is not consuming energy. Likewise, the amount of clutch coupling may be smoothly varied to provide a variable speed with slippage occurring from the low power input to the clutch through the full power input. At full power, there is no slippage and the driving part and driven part are locked rotating at the same rotational speed.

In accordance with important aspects of the invention, there is an overall temperature management system and a computer-managed cooling system, which allow better and tighter modulation control of the engine cooling. More specifically, there is now provided a computer-managed cooling system for a vehicle which has increased number of input sensing elements which sense the state or condition of a number of pieces of equipment and temperatures and which provide inputs to a computer which provides fan output signals and current flow to the fan clutch. The voltage may quickly and incrementally modulated to thereby modulate the amount of torque transfer to the fan to provide a true, variable speed for the fan depending upon the environmental conditions. This computer-managed cooling system, unlike the on/off, direct systems of conventional trucks, can provide power transmission to the fan that is responsive to the overall thermal conditions, and not just water temperature and speed conditions, as in the usual and conventional cooling systems having an on/off fan clutch.

In accordance with the preferred embodiment of the invention, the overall temperature management controller system includes sensors connected to the air conditioner and supplying input signals to the controller, which operates according to an algorithm that does not require the fan clutch to be engaged (or requires it to be only partially engaged) if the other parameters being measured indicate that the engine and air conditioner are being adequately cooled. Additionally, the present invention provides a much tighter or closer temperature modulation control by monitoring a number of conditions beyond the usual cooling temperature thermal sensor and the speed sensor by having, e.g., an air conditioner sensor, a waste gate sensor which senses when a turbocharger's waste gate is in operation. The waste gate is connected to return from the turbocharger the exhaust gases which are to be reburned, as during a truck start-up when heavy, white smoke exhaust would otherwise be discharging from the truck's engine.

The temperature modulation may be tuned or measured very precisely using a temperature resistance varying sensor to measure the cooling temperature, rather than a thermostatic on/off switch. Slight changes in resistance send electrical signals to the controller to allow a finer temperature cooling range for the present invention relative to the usual 7.5° F. plus or minus a tolerance of 2° F. in temperature for the prior art electromagnetic and pneumatic fan clutches. Other environmental sensing conditions may be sensed and signals therefrom fed to the computer to cause a variation in the current or power to the fan clutch so that only the horsepower needed to keep the fan operating at the desired speed is used for the cooling. Because the microprocessor can rapidly calculate the amount of fan cooling needed on an almost instantaneous basis, the electrical modulation and torque transfer through the magnetic field modulated clutch may be done quickly and continually.

In accordance with another aspect of the invention, the preferred fan clutch comprises a radially disposed set of electromagnets and a surrounding set of pole pieces separated by an air gap without any direct engaging mechanical clutch faces. The magnetic field between the electromagnets and the pole pieces is increased as the current through the electromagnets is increased. At low current, such as provided by a one volt potential, there is substantial slippage with the driving element rotating much slower than the driven element. At half current, such as provided by about 6 volts, the driven element will be rotating at about one-half the speed of the driving element with substantial slippage occurring between the clutch driving element and the clutch driven element. At about eleven or twelve volts potential of current through the electromagnets causes them to provide a magnetic flux density sufficient to provide full magnetic coupling. With full magnetic coupling, the pole pieces and the driving magnets rotate at the same speed and without slippage therebetween. Thus, it may be seen that the torque transfer may be modulated between zero percent, when the clutch is declutched, to 100 percent torque transfer when the clutch is fully engaged.

Preferably, slots are formed in the ferromagnetic material of the electromagnets to reduce any eddy currents being induced therein. Likewise, it is preferred to have slots in the pole pieces to reduce any eddy currents resulting from slippage when driving at less than fully engaged, 100% torque transfer.

It will be appreciated that the present invention allows a direct crankshaft mounting of the fan clutch to the crankshaft because the driving portion or element of the electromagnetic clutch is spaced by an air gap from the driven element so that there is no rubbing or mechanical vibration of the driving portion against the driven portion, as in the engaged clutch faces of the prior art, fan face clutches. Unlike the other electromagnetic clutches currently being mounted directly on engine crankshafts, which are always providing at least 40% power to the fan, the present invention may have its fan fully decoupled so that there is no horsepower being used when there is no need for the same under control of the on-board controller.

DETAILED DESCRIPTION OF THE PREFERRED EMBODIMENT

Figure 1:
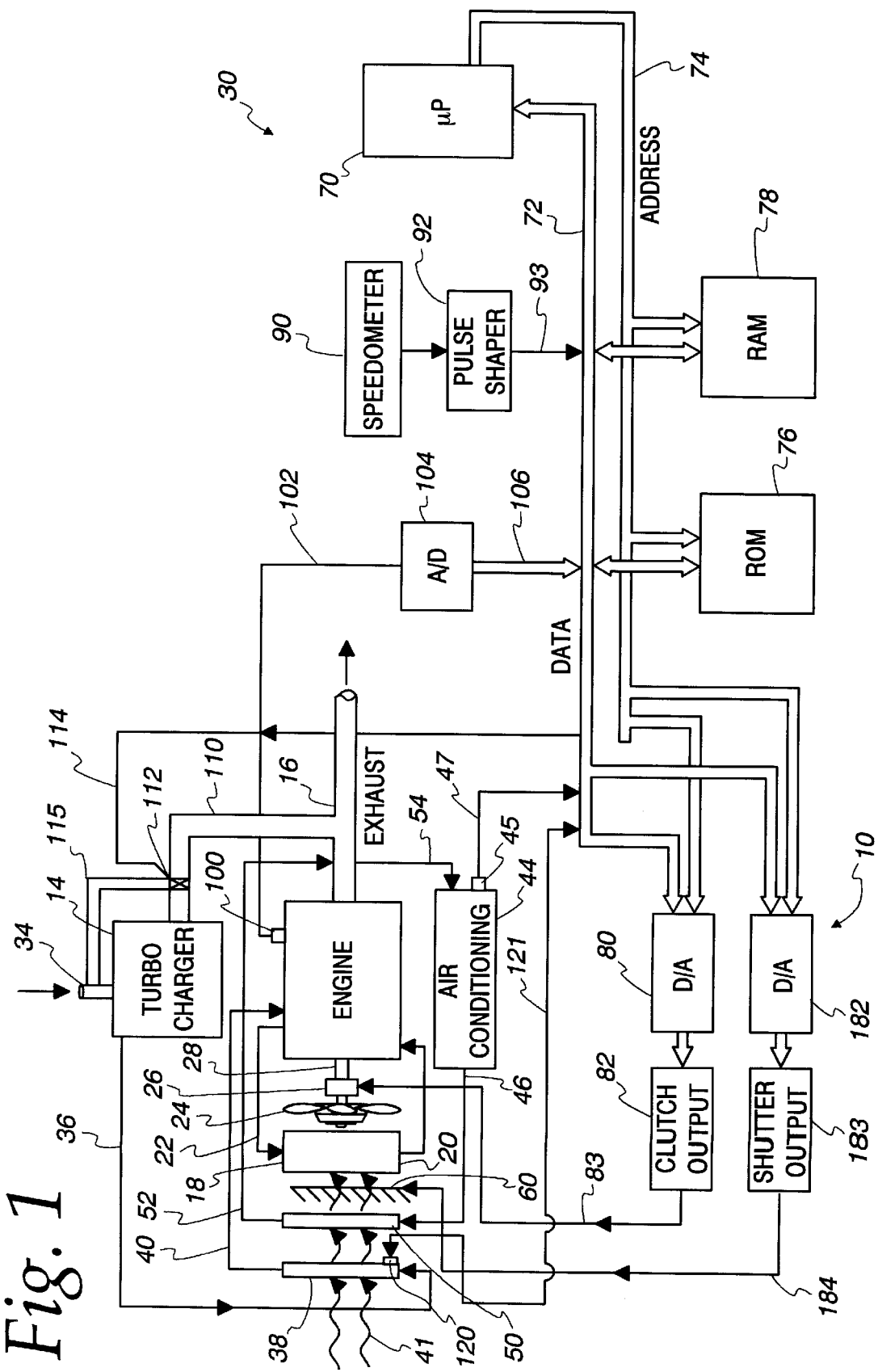
FIG. 1 is a block diagram of an electromagnetic clutch system embodying the novel features of the preferred embodiment of the invention.
Figure 5:
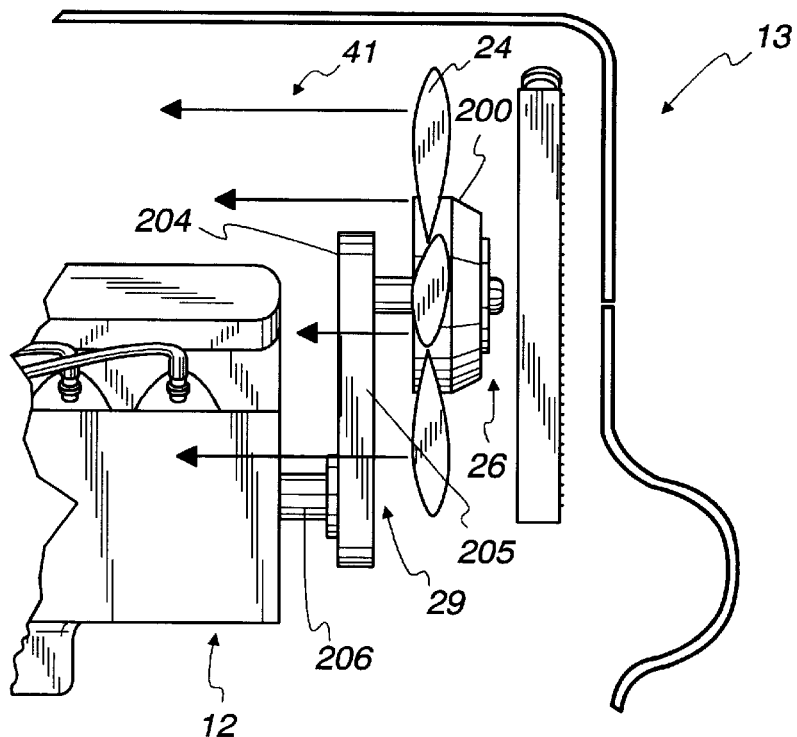
FIG. 5 is an illustration of a fan belt drive for the fan using the electromagnet clutch.

Referring now to the drawings, and especially to FIG. 1, a vehicle 10 is generally shown therein in block format and includes an engine 12 mounted within a vehicle 13 (FIG. 5). When the vehicle 13 is a truck or a turbocharged automobile, the engine 12 has connected thereto a turbocharger 14 for receiving air from an outside inlet 34 and an exhaust 16 for delivering exhaust gases either to the turbocharger or to the environment. The engine includes a cooling system 18 including a radiator 20 for a liquid coolant connected in a cooling loop 22 to the engine. Associated with the radiator 20 is a fan 24 coupled by a magnetic clutch 26 to an output shaft 28 of the engine 12. The output shaft may, for instance, be a crankshaft or some other device, such as a drive belt system 29, as shown in FIG. 5. A controller or controller circuit 30 is coupled to the electromagnetic clutch 26 to control actuation or deactuation of the fan as well as the relative fan speed and the amount of fan load presented to the engine 12 under varying conditions.

During normal operation, intake air flows into an intake 34 and is delivered to the turbocharger 14 where it is compressed and sent out on a compressed air line 36 to an intercooler 38. The intercooler 38 is positioned front-most in the tractor or cab portion of the truck, and receives cooling air from an outside source as shown by an air stream or air flow path 41. That cooling air then reduces the temperature of the compressed air at the intercooler 38, allowing higher, effective head pressures to be supplied at a compressed line 40 which is coupled to a manifold of the engine 12. Heat from the compressed air from the turbocharger 14 is transferred to the air stream 41 flowing about the intercooler. The engine also has a power take-off to drive an air conditioning compressor included in an air conditioning unit 44 and the air conditioning unit 44 supplies liquid phase refrigerant on a liquid phase line 46 to a condenser 50 positioned immediately behind the intercooler 38. A sensor 45 at the air conditioning unit or at its condenser may supply air conditioning signals over line 47 to a data bus 72 extending to the controller 30 to indicate the condition of the air conditioner. Heat is transferred from the gas in the condenser 50 causing the gas to liquify and being supplied to a liquid line 52, which is fed back through an evaporator (not shown) and via a line 54 to the air conditioning compressor. The evaporator is positioned so that air may flow thereover to transfer heat to the air stream 41. Cooled air or liquid is delivered to the cab of the vehicle for cooling the interior of the cab for the driver and any passengers' comfort. The cooling air stream 41 flows past the condenser 50 and through a shutter 60 and is delivered to the radiator 20 where it cools the liquid coolant in the radiator to keep the engine cool.

The rate at which the engine 12 is effectively cooled as well as the rates at which the intercooler 38 and the air conditioning condenser 50 are cooled is controlled to some extent by the rate at which the fan 24 turns to cause air flow. In the event that the vehicle 10 is moving at high speed down the road, a ram air stream 41 flowing through the intercooler 48, the air conditioning condenser 50, the shutter 60 and the radiator 18, and keeps the engine adequately cool. It is usually unnecessary in that circumstance to maintain the fan operating.

The operation of the electromagnetic clutch and of the fan may be precisely controlled depending on a number of operating conditions or parameters by the control circuit 30. The control circuit 30 includes a microprocessor 70, having a data bus 72 and an address bus 74, which operates off a stored program and a read-only memory 76. The read-only memory 76 could have any other type of non-volatile or backed up store, such as an EAROM, EPROM or battery backed up CMOS ram or the like for storing the program contents. The program is executed in the microprocessor and transitory and variable values may be stored in a random access memory 78 connected to the data bus 72 and to the address bus 74. In addition, a separate EEROM can be supplied for storing in non-volatile format set points, limits and other data which should be held in the controller 30 even when the circuit 30 is not receiving energizing power. The microprocessor sends data commands through a digital to analog converter 80 coupled to the data bus 72 and the address bus 74, which provides an analog output to a clutch output drive circuit 82 for supplying current to the electromagnetic clutch 26. That current is modulated under the control of the microprocessor 70 to determine the degree of drive or slippage transferred from the output shaft to the engine 12 through the magnetic clutch 26 to the fan 24. converter 104 which supplies a digital temperature signal on a digital temperature bus 106 to the data bus 72, which is then transferred to the microprocessor 70. If the temperature of the engine is very high, the microprocessor will command the clutch output drive 82 to lock up the magnetic clutch 24, causing the fan to run at its maximum speed as driven by the output of the engine. This results in the maximum horsepower from the engine being used to drive the fan to provide the most cooling.

If the temperature is at an intermediate range and the speedometer 90 indicates that the vehicle is moving at intermediate range, a signal is sent over line 93 to the data bus 72 to the controller 30 and a modulated signal commands the clutch output circuit to provide less than the maximal current but more than a minimal current, will be supplied to the magnetic clutch allowing some slippage but not complete free-wheeling. Thus, a reduced amount of air flow will be used as will less horsepower from the engine for fan rotation.

Operation of the electromagnetic fan clutch 26 and the fan output is also effected by the condition of the turbocharger 14 and its intercooler 38. The turbocharger 14 is driven by exhaust gas on an exhaust gas line 110 which is connected into the turbocharger. A waste gate 112 which is connected to an electrical waste gate control line 115, may be positioned in an open or closed position. When the waste gate is closed, a portion of the exhaust will be circulated back into the inlet air stream where the partially burned exhaust will be compressed along with clean air. This typically occurs when the engine is very cold, as indicated by the signal from the temperature output sensor 100. A sensor 120 may also be provided on the intercooler 38 to send a condition signal, such as a temperature intercooler, signal over line 121 to the data bus 72 and to the controller. A sensor can be provided at the waste gate, if desired. This is done in order to avoid pollutants from only partially burned exhaust gases due to the cold engine from being dumped out the exhaust into the environment. The mixture of clean air and partially burned exhaust will then flow through the intercooler 38 and into the engine, where the partially burned hydrocarbons will be more completely burned. In the event that the engine comes up to a particular set point temperature, the microprocessor will then command through line 114 that the waste gate 112 close preventing any of the exhaust from being shunted into the inlet 34 of the turbocharger.

The microprocessor 70 also controls the position of the shutter 60 in response to its input signals. The microprocessor 60 forward digital shutter command signals over the data bus 72 to a shuttle control digital to analog converter 182. The converter 182 outputs a shutter control signal to an output circuit 183, which sends a control voltage over a line 184, to step the shutters 60 open or closed in response thereto. The shutters 60 are normally kept closed or partially closed in cold weather conditions to avoid wasted heat that would otherwise be supplied to the interior of the cab for the driver's comfort.

Figure 2:
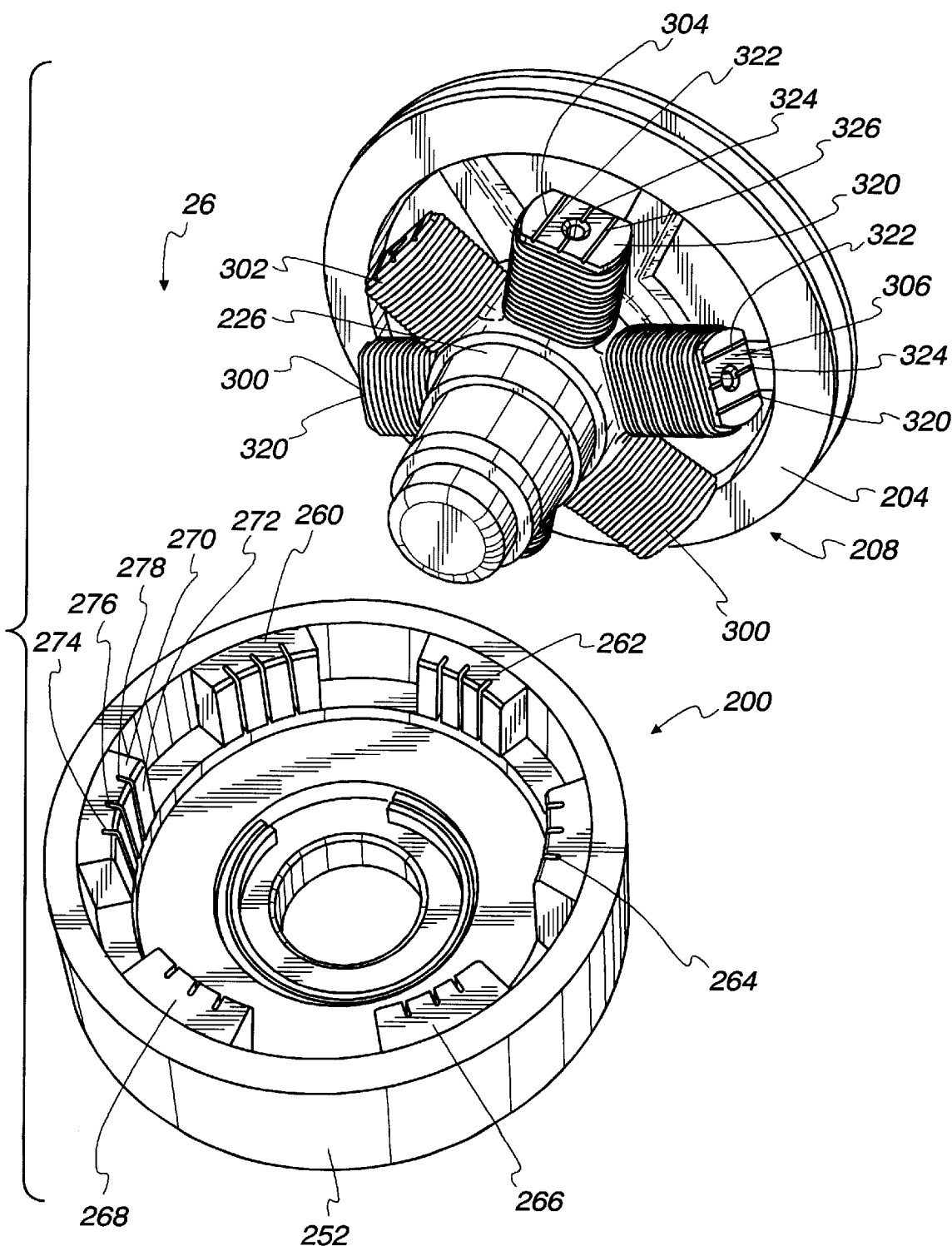
FIG. 2 is an exploded perspective view of an electromagnetic fan clutch shown in FIG. 1.
Figure 3:
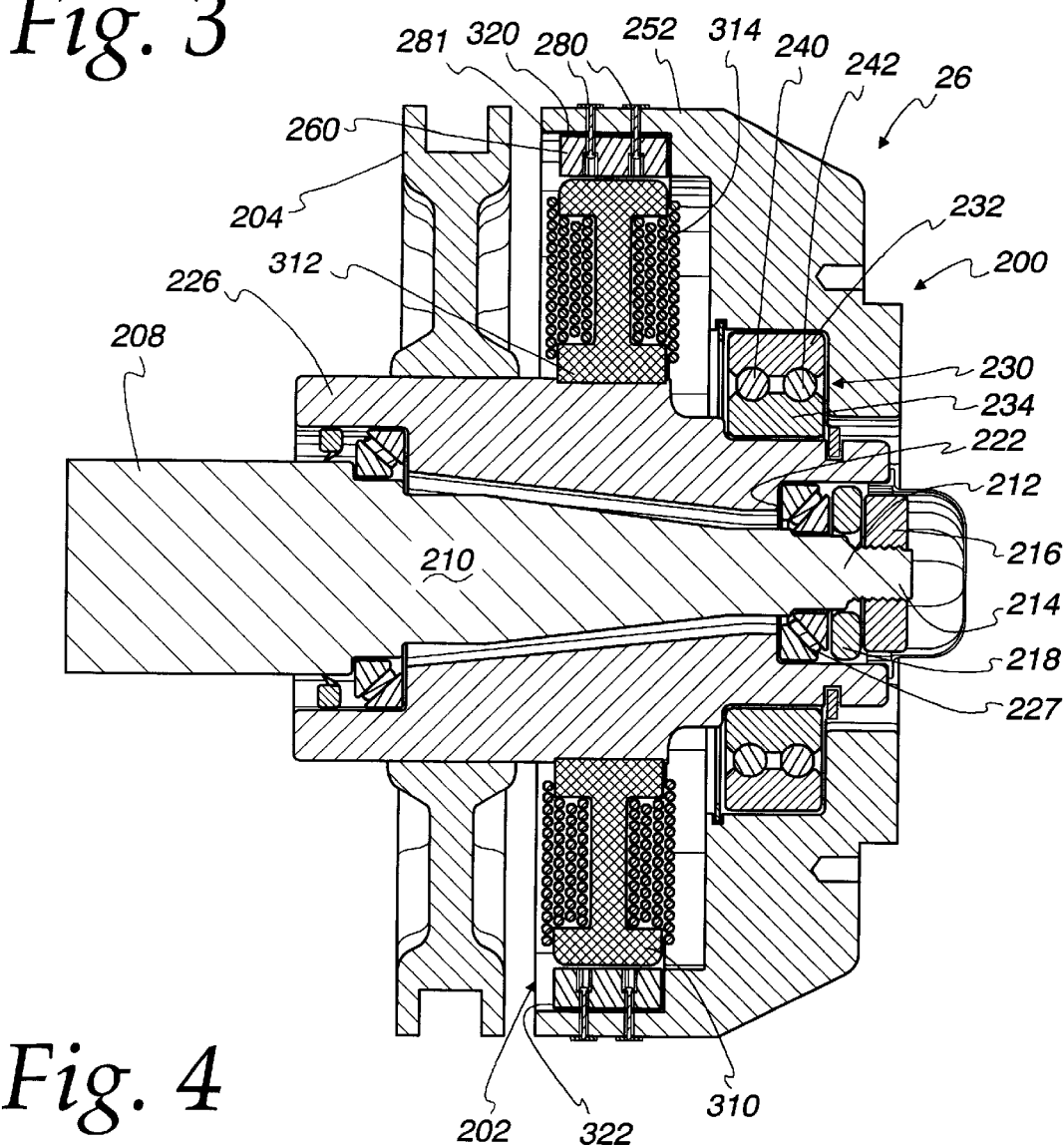
FIG. 3 is a cross-sectional view taken through the fan clutch and an input shaft to the clutch.
Figure 6:
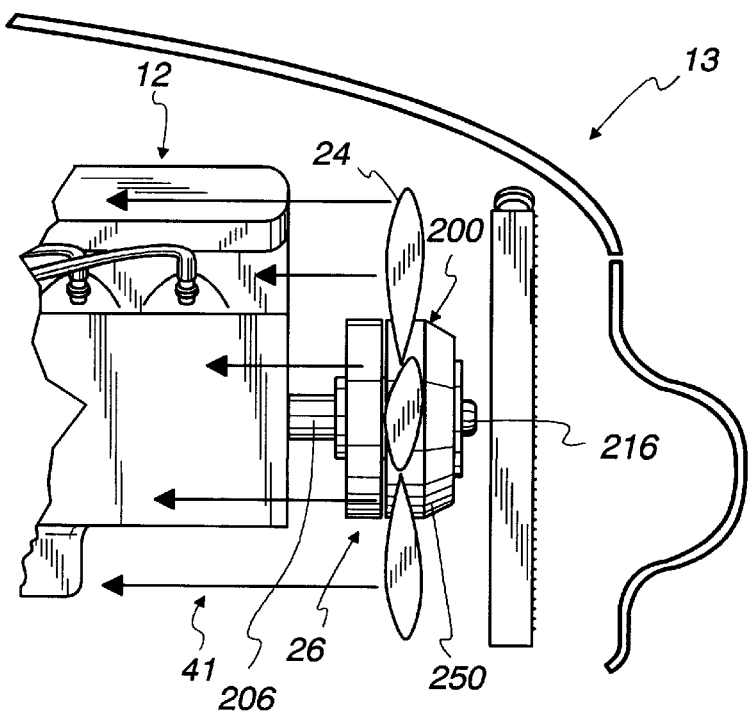
FIG. 6 illustrates the electromagnetic fan clutch of FIG. 2 directly mounted onto a crankshaft of an internal combustion engine.

Referring now to FIGS. 2 and 3, the magnetic clutch 26 is shown therein and includes a driven portion 200 and a driving portion 202. The driving portion 202 may, for instance, have a fan pulley 204 (FIG. 3) thereon for engagement with a fan belt 205 (FIG. 5) or may be directly coupled at a crankshaft output 206 (FIG. 6) of the engine. A mounting shaft 208 has a constant tapered section 210 and a varying or tapered section 212, ending in a threaded portion 214 which is engaged by a cap nut 216. The cap nut 216 is threaded onto the threads 214 and holds a washer 218 in contact with a thrust bearing 220. The thrust bearing 220 is seated against a shoulder 222 and holds a driving portion sleeve 226, which is rotatably mounted on the fixed shaft 208. A ball bearing 230 having a pair of bearing races 232 and 234 for respectively holding balls 240 and 242 rotatably mounts the driven member 208 on the driving member sleeve 226. The driven member comprises a cup-like member 250 ending in an outer wall 252 and having a plurality of pole pieces, which are substantially identical to each other respectively numbered 260, 262, 264, 266, 268 and 270 (FIG. 2). Taking pole piece 260 as being exemplary, it is formed with an arcuate or mating face 272 having three eddy current depressing slots 274, 276 and 278 formed therein. The face 272 defines a portion of an air gap with a respective solenoidal magnet on the driving element 202, as will be seen hereinafter. The pole pieces are fastened by pairs of fasteners 280 which hold the pole pieces to an outer ring or annular wall 281 of the cup-like structure 250. While in one embodiment both the pole pieces and the cup-like structure can comprise a metallic material with the pole pieces being ferromagnetic and the cup-like structure being comprised of aluminum. In another construction having very low moment of inertia and lightweight, the cup-like structure may be comprised of plastic or a lightweight polymer. A ring of metal or wire is mounted on the plastic cup-like structure to provide a complete flux path between all of the pole pieces 260–270. The fan 24 is attached to the outer portion of the cup-like structure 250 (FIGS. 5 and 6).

The driving element includes a central hub portion 206 of the sleeve 226 with six electromagnets or solenoids 300, 302, 304, 306, 308 and 310 extending from the hub. As mechanical motion is developed by the engine, the magnets 300 through 310 are spun about the central rotational axis through the hub portion 206. Each of the magnets includes a center, ferromagnetic section as exemplified by magnet 300 with the ferromagnetic material being a soft iron core 312. Wound about the soft iron core 312 is a coil 314 which is energized by the current on line 83 from the clutch output driver 82. In the present embodiment relatively large amounts of maximal current can be conducted through each of solenoids up to 40 amperes providing a very large, magnetic flux density at a face 320. For instance, of the solenoid 300 the face 320 is curved to match the curvature in the pole piece 260 at its face 272 and to define a narrow air gap therebetween. The face 320 has formed therein a plurality of eddy currents depending slots 322, 324 and 326.

During operation of the clutch, mechanical energy is continually being supplied by the engine to the driving element 202 either by a central crankshaft output 206 or via a fan belt pulley system 29. In the event that no current is passing through, the coils of the solenoidal magnets, the driven element 200 either stand still or free-wheels in the air stream in the radiators as a result of the force of the moving ram air impinging on the fan 24 to rotate the same.

Figure 4:
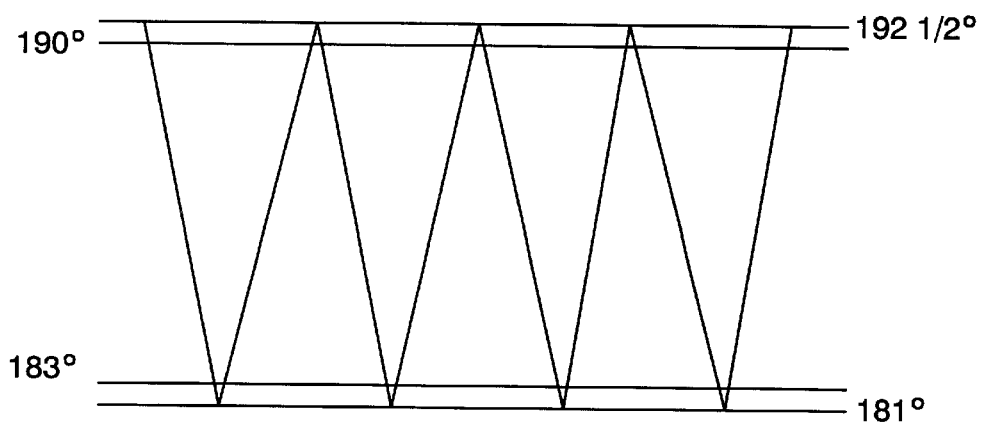
FIG. 4 is a view illustrating a typical temperature control curve for the temperature of the liquid coolant in an internal combustion engine.

As the engine, however, heats up (as mentioned above) in the conventional system, if a thermal switch is used to sense the temperature of the coolant, the switch may experience a dead band up to 11½° ranging from 181° to 192½° with nominal limits being at 190° and 183° F., as shown in FIG. 4. That dead band would lead to relatively imprecise control of the present invention, and accordingly, a RTD temperature sensor has been substituted therefor as exemplified by the RTD sensor 100. The sensor 100 supplies the temperature signal to the microprocessor 70 which then responds to that temperature signal as well as to the speedometer signal and the air conditioning load by commanding current to flow through the solenoids of the electromagnets causing a magnetic field to tend to attract the pole pieces 260–270 into alignment with the electromagnets 300–310. The amount of the current will be varied according to the thermal demands being placed on the system, as determined by the microprocessor. Because the amount of the current may be smoothly varied from zero current to a maximal current flow, for example 40 amperes, the amount of mechanical coupling between the output shaft 28 and the fan 24 may be varied from no coupling at all to complete or lock-up tight coupling. However, since the driven and the driving element do not frictionally engage each and, in fact, are connected only via a low friction bearings from the standpoint of normal clutch operation, there are essentially no moving parts to wear out. In addition, the degree of mechanical loading on the engine may be smoothly varied from zero loading with, in essence the consumption of zero horsepower from the engine, all the way to 40 or 80 horsepower at full lock-up depending on the size of the fan.

Figure 7:
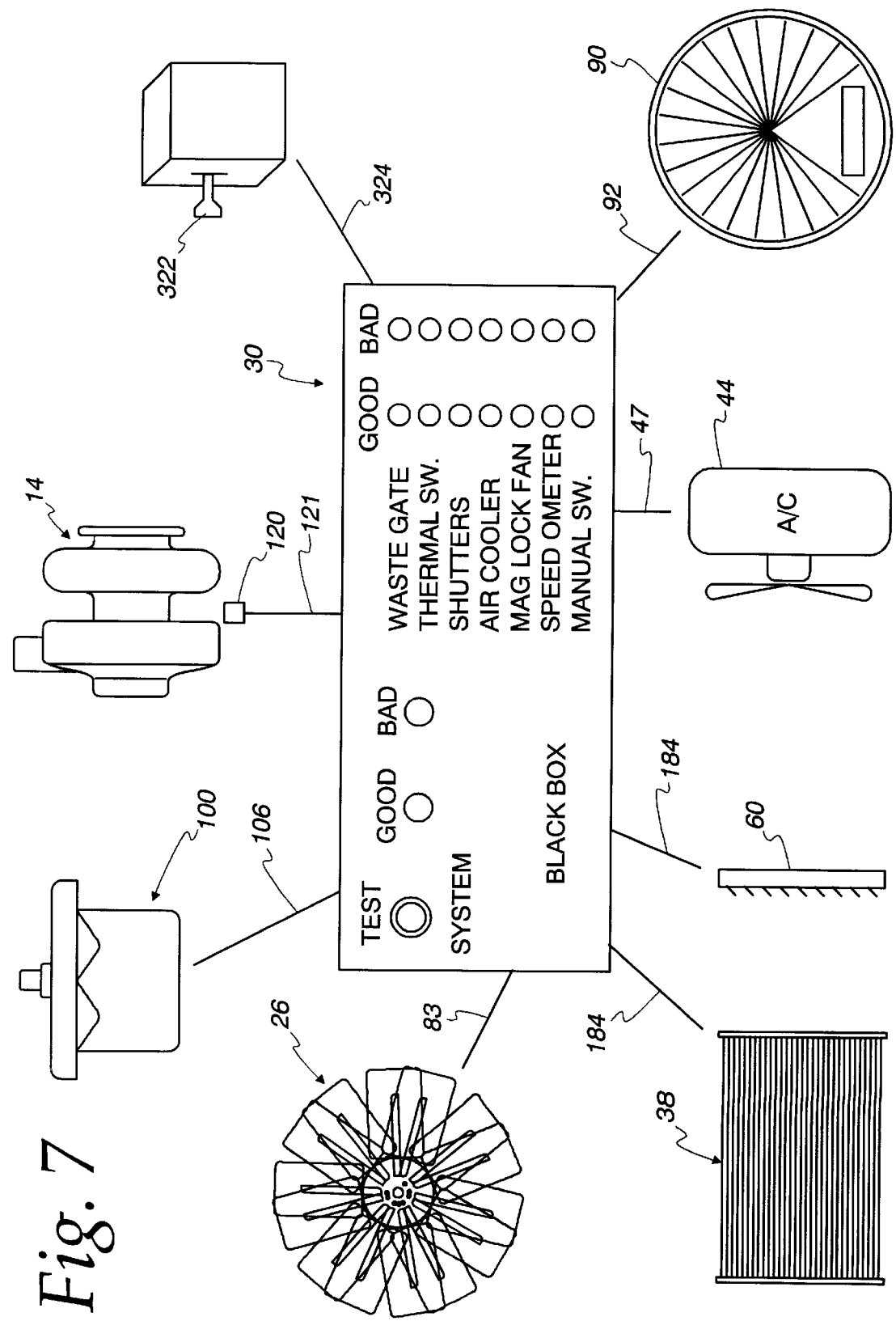
FIG. 7 is a diagrammatic view of a control panel for the electromagnetic clutch control system.

If desired, a manual override switch 322 (FIG. 7) may be used to override the controller 30 and to cause a full operation of the clutch to provide the maximum cooling by the fan. The truck driver may want to have or to be assured of maximum fan cooling, and he can throw the override switch 322 connected by line 324 to the electrical circuit operated by controller, if he so desires.

Because there is-no direct mechanical engagement between the driving element 202 and the driven element 200, vibrations in the crankshaft 206 are not transmitted by the driving element which is separated by air gap 320 from the driven element. That is, the electromagnets may be vibrated with the crankshaft but the air gap 320 spaces the pole pieces 260–270 from rubbing or physical contact with the electromagnets. Hence, the crankshaft vibrations do not cause a rubbing or other relative movement between the electromagnets and pole pieces; whereas, such rubbing does occur between engaged clutch faces, as in the prior art clutches described above. With electrical power at a very low or no current, the pole pieces will not be magnetically attracted to follow the rotating magnets and no horsepower will be used to turn the fan. At full current to the electromagnets, the magnetic field will be strong enough to maintain each of the pole pieces aligned with a corresponding electromagnet. With an intermediate amount of magnetic field between the electromagnets and the pole pieces, the pole pieces rotate much slower than the electromagnets using less horsepower than when there is no slippage. The driving of the driven element 200 by the driving element is solely by the magnetic field which may be modulated by the controller 30.

The controller 30, the electromagnetic clutch and the sensors of various operating conditions and parameters, some of which are described above, allow a better and more fuel-efficient control of the engine cooling fan. The invention may be used on stationary internal combustion engines as well as on vehicles which may be trucks, automobiles or the like.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. An apparatus having a rotatable driven shaft;
   a driving element driven by the rotatable shaft;
   a driven element for being selectively coupled to the driving element for a torque transfer with the driving element;
   a first electromagnetic element on the driving element;
   a second electromagnetic element on the driven member with the coupling therebetween solely by a magnetic field for the torque transfer with-respect to the rotatable shaft;
   one of said electromagnetic driving and driven elements comprises a plurality of radially-extending electromagnets; and
   the other one of said electromagnetic driving and driven elements comprises a plurality of pole pieces spaced radially from the radially-extending electromagnets to define an air gap therebetween across which magnetic flux may extend;
   an electric current device providing electrical current only to electromagnets and no substantial current to the pole pieces when generating the magnetic flux.

2. An apparatus in accordance with claim 1 wherein slots are provided in the radially-extending electromagnets to reduce eddy currents being induced therein.

3. An apparatus in accordance with claim 2 wherein slots are provided in the pole pieces to reduce eddy currents being induced therein.

4. An apparatus in accordance with claim 1 wherein the radially-extending electromagnets comprise a central core of ferromagnetic material and a wound wire coiled about the ferromagnetic material.

5. An apparatus having a rotatable shaft;
   a driving element driven by the rotatable shaft;
   a driven element for being selectively coupled to the driving element to receive torque transfer from the driving element;
   a first electromagnetic element on the driving element;
   a second electromagnetic element on the driven member with the coupling therebetween solely by a magnetic field to transfer torque from the rotatable shaft to rotate the fan to cool the engine;
   the electromagnetic driving element comprising a rotatable support and a plurality of electromagnets projecting radially outwardly from the rotatable support;
   the driven element comprises a rotatable hub encompassing the rotatable support and the radially, outwardly-projecting electromagnets; the driven electromagnetic element comprises a plurality of pole pieces on the rotatable hub spaced radially outwardly of the electromagnets, and separated therefrom by an air gap to allow the rotatable support and electromagnets to rotate freely without mechanically engaging the rotatable hub or pole pieces thereon; and
   an electrical device providing electrical current only to the electron apparatus and no substantial current to the pole Pieces when generating the magnetic flux.

6. A magnetic field apparatus for operative connection to a rotatable shaft comprising:
   a driving element driven by the rotatable shaft for rotating the fan;

a driven element for selectively coupling to the driving element for a torque transfer with respect to the driving element;

a first electromagnetic element on the driving element;

a second electromagnetic element on the driven member with the coupling therebetween by a magnetic field with an air gap between the first and second electromagnets when transferring torque therebetween;

the driving element comprising a rotatable support and a plurality of electromagnets projecting radially outwardly from the support;

the driven element comprises a rotatable hub encompassing the rotatable support and radially-projecting electromagnets; and the driven electromagnetic element comprises a plurality of pole pieces on the rotatable hub spaced radially outwardly of the electromagnets and separated therefrom by an air gap to allow the support and electromagnets to rotate freely without mechanically engaging the rotatable hub or pole pieces thereon; and an electric current circuit providing electrical current only to the electromagnets and no substantial current to the pole pieces to generate a magnetic field between the electromagnets and the Pole pieces for said torque transfer.

* * * * *